United States Patent [19]

Hamer

[11] Patent Number: 4,587,869
[45] Date of Patent: May 13, 1986

[54] METHOD AND APPARATUS FOR RECONDITIONING BAND SAW BLADE

[76] Inventor: Gerald D. Hamer, R.D. 5, Box 303 C, Lewistown, Pa. 17044

[21] Appl. No.: 746,873

[22] Filed: Jun. 20, 1985

[51] Int. Cl.[4] ............................................. B23D 63/04
[52] U.S. Cl. .......................................... 76/58; 76/37; 76/112
[58] Field of Search ................... 76/25 R, 112, 37, 58, 76/66

[56] References Cited

U.S. PATENT DOCUMENTS

| | | | |
|---|---|---|---|
| 2,510,462 | 6/1950 | Christenson | 76/29 |
| 2,581,415 | 1/1952 | Hull | 76/58 |
| 3,661,037 | 5/1972 | Athanasoulas | 76/58 |
| 4,072,068 | 2/1978 | Idel et al. | 76/58 |

Primary Examiner—Roscoe V. Parker
Attorney, Agent, or Firm—Harvey B. Jacobson

[57] ABSTRACT

A pair of companion saw blade tooth set dies are provided for guided relative movement toward and away from each other relative to a support structure from which a saw blade may be guidingly supported for predetermined indexed positioning of right and left set teeth thereon relative to the location of the aforementioned companion tooth set dies. The dies, when moved into engagement with the right and left set teeth of the saw blade, are operative to engage and bend the right and the left set teeth back to and past neutral set positions and to the reverse set positions with the previous right and left set teeth comprising left and right set teeth, respectively, and the bend areas of the reverse set teeth being formed in the longitudinal marginal portion of the blade from which the teeth project.

9 Claims, 9 Drawing Figures

METHOD AND APPARATUS FOR RECONDITIONING BAND SAW BLADE

BACKGROUND OF THE INVENTION

This invention relates to a method and apparatus for reconditioning worn band saw blades including longitudinally spaced teeth, some of which teeth are right set teeth and others of which teeth are left set teeth. The right and left set teeth are bent to the right and left, respectively, intermediate the tip and root ends of the teeth and inwardly of the hardened tooth tip ends. During the reconditioning process, the right and left set teeth are reset to left and right set teeth, respectively, with the bent areas of the reset teeth lying along a zone spaced slightly inwardly of the marginal edge of the band from which the root ends of the teeth project.

Various different forms of saw blade reconditioning units heretofore have been provided such as those disclosed in U.S. Pat. Nos. 2,510,462, 2,581,415, 3,661,037 and 4,072,068. However, these previously known forms of saw blade reconditioning units do not include structure whereby right and left set teeth may be reset to left and right set teeth, respectively, wherein the bend zones of the reset teeth are inwardly of the marginal edge of the blade from which the teeth project.

SUMMARY OF THE INVENTION

When a band saw blade has been in use for some time, the tip ends of the cutting edges thereof naturally become somewhat rounded and worn and the extreme right and left corners of left and right set teeth, respectively, of the blade become worn more than other tooth portions of the blade and it is substantially impossible to renew the sharpness of these outer corners without substantially reducing the height of each tooth. However, the right and left tip corner portions of left and right set teeth may be only minimally worn after considerable usage of a saw blade and the reconditioning unit of the instant invention is operative to reset the right and left set teeth to the left and right, respectively, thereby exposing these minimally worn sharpened edge corner portions. After the right and left set teeth have been reset to left and right set teeth, the tooth edges may be dressed to insure proper tooth cutting lead angle.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 6 is a fragmentary side elevational view of a conventional band saw blade;

FIG. 7 is an enlarged fragmentary transversee sectional view of the blade illustrated in FIG. 6 showing the worn outer corner portions of the right and left set teeth;

DESCRIPTION OF THE PREFERRED EMBODIMENT

Figure 1:
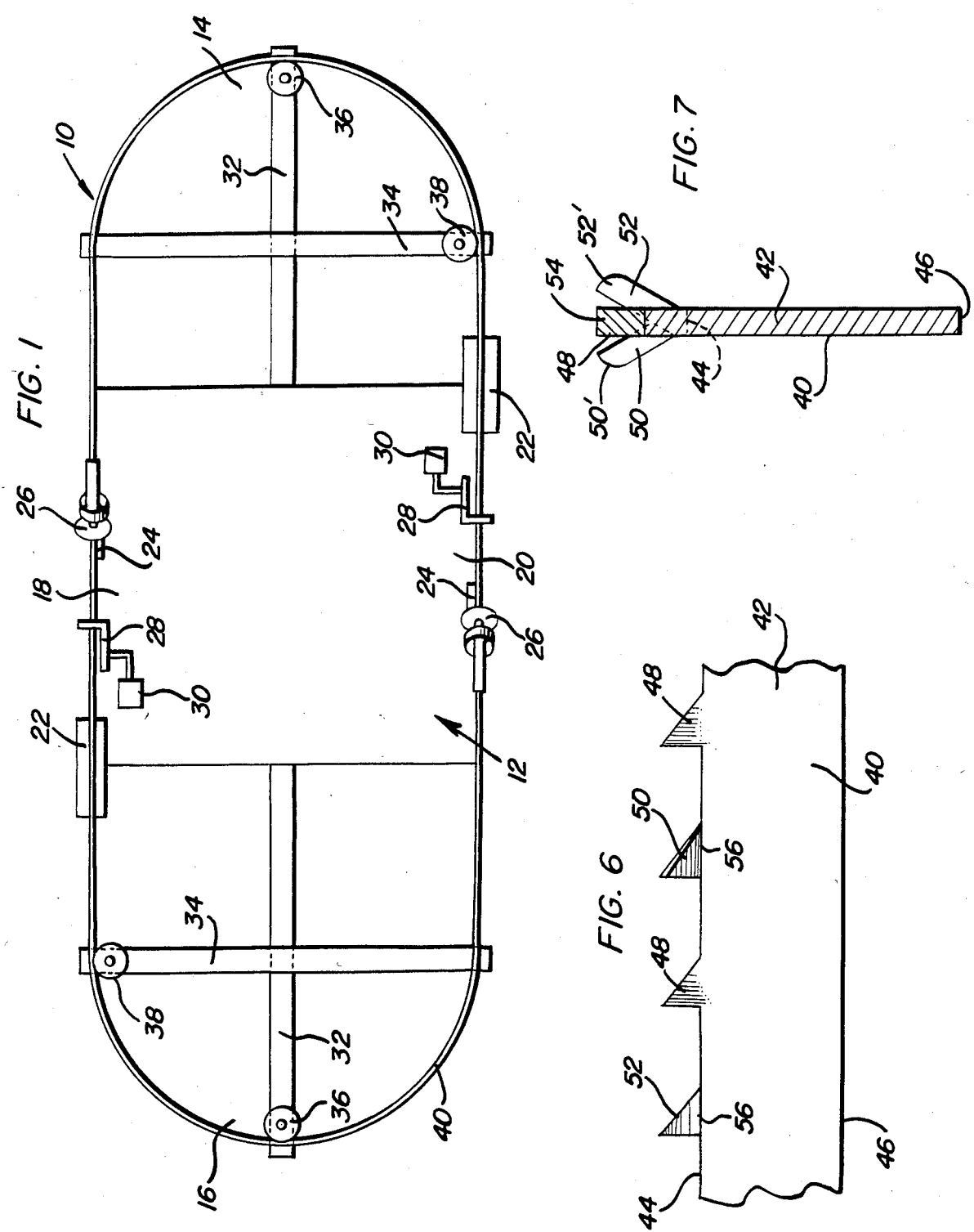
FIG. 1 is a schematic top plan view of the apparatus of the instant invention by which band saw blades may be reconditioned.
Figure 2:
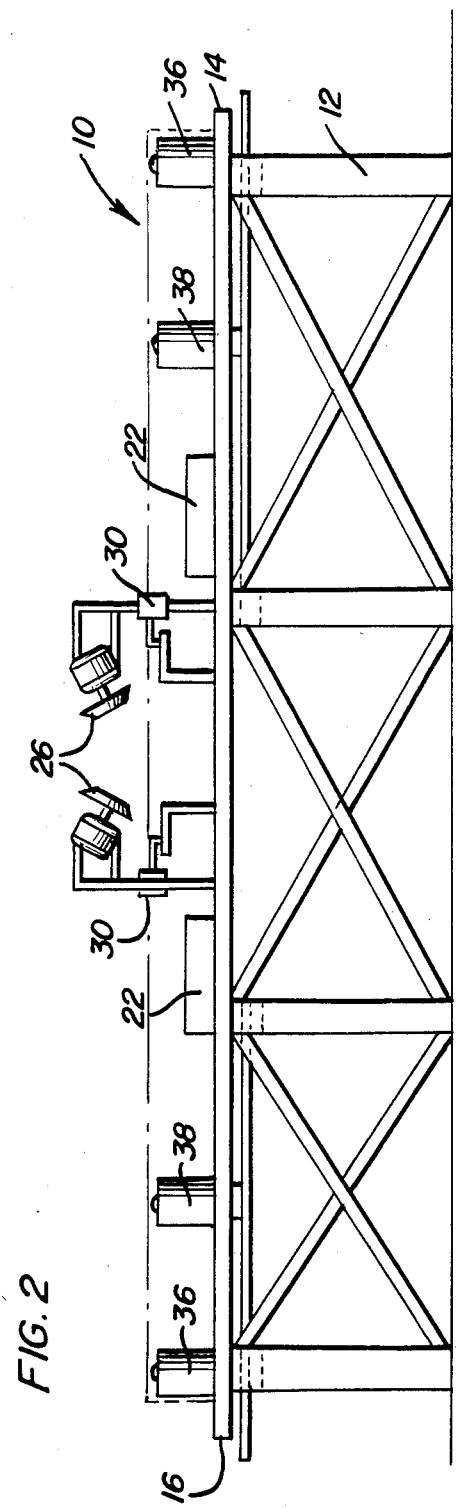
FIG. 2 is a side elevational view of the apparatus shown in FIG. 1.

Referring now more specifically to the drawings, the numeral 10 generally designates a band saw blade reconditioning apparatus including a table 12 having opposite ends 14 and 16 and opposite sides 18 and 20. Each side 18 and 20 includes a die station 22, a blade holder 24, a motor driven grinding wheel 26 operatively associated with each blade holder 24, an index finger 28 and an accumulator 30. Each end 14 and 16 includes a pair of adjustable support arms 32 and 34 from which guide rollers 36 and 38 are journalled, the guide rollers 36 and 38 being operative to guidingly engage a loop-type band saw blade 40 supported from said table for incremental longitudinal advancement of the blade.

With attention now invited more specifically to FIGS. 6 and 7 of the drawings, it may be seen that the blade 40 comprises an elongated band member 42 having opposite side longitudinal edges 44 and 46. The edge 44 includes a plurality of longitudinally spaced neutral set teeth 48, left set teeth 50 and right set teeth 52 projecting outwardly therefrom.

During initial construction of the band saw blade 40, the band member 42, constructed of a given alloy, initially has a more narrow band 54, see FIG. 7, of a harder alloy fused to the marginal edge of the band member 42 remote from the longitudinal edge 46. Thereafter, those portions of the narrow band 54 and the band member 42 disposed between the desired longitudinally spaced teeth are manufactured from the combined band member 42 and narrow band 54 in order to form the teeth 48, 50 and 52, the depth of the teeth being slightly greater than the width of the narrow band 54. After the teeth have been formed on the blade 40, the teeth 50 and 52 are then set to the left and right along bend zones 56 spaced outward of the longitudinal edge 44 but inward of the narrow band 54. Thereafter, the blade 40 may be heat treated whereby the narrow band 54 defining the tip ends of the teeth 48, 50 and 52 is further hardened, the heat treatment process taking place after the setting of the teeth 50 and 52 inasmuch as performing the setting operation after the heat treating operation at ambient temperature can cause breaking or chipping of the outer end portions of the teeth.

Each die station 22 includes a stationary die holder 60 removably supporting a first die 62 and a movable die holder 64 removably supporting a second die 66. The dies 62 and 66 oppose each other and the movable holder 64 is movable toward and away from the stationary holder 60 by a ram 68. In addition, each of the dies 62 and 66 includes a horizontally elongated leaf spring 70 for engaging the opposing side of the blade 40 to maintain blade center line in the operation allowing clearance between the blade and die angle surfaces. In addition, the springs apply some tension for indexing and serve to hold the blade in upright position.

Figure 5:
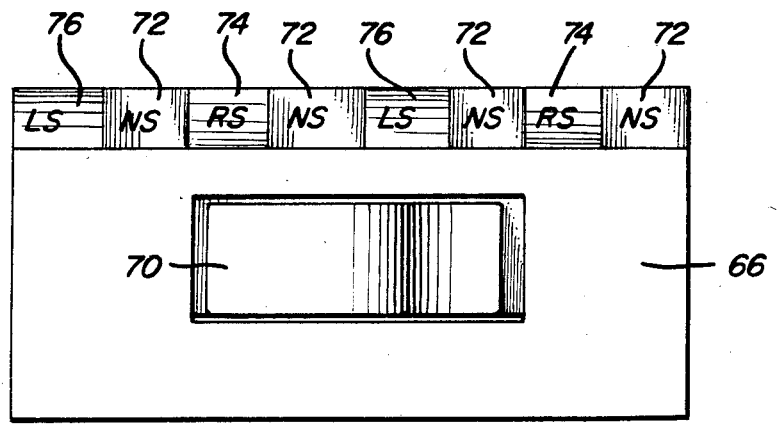
FIG. 5 is a face elevational view of one of the reset dies.

With attention now invited more specifically to FIG. 5, the face of the die 66 may be seen and it is apparent that the upper marginal edge of the die 66 includes neutral set surfaces 72, right set surfaces 74 and left set surfaces 76, the die 62 including vertical surfaces opposing the neutral set surfaces 72 and oppositely inclined surfaces opposing the right and left set surfaces 74 and 76.

Figure 9:
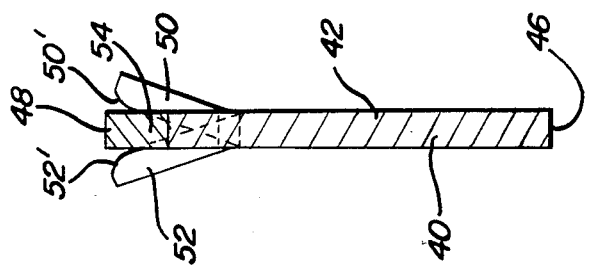
FIG. 9 is a transverse sectional view of the blade illustrated in FIG. 8.
Figure 8:
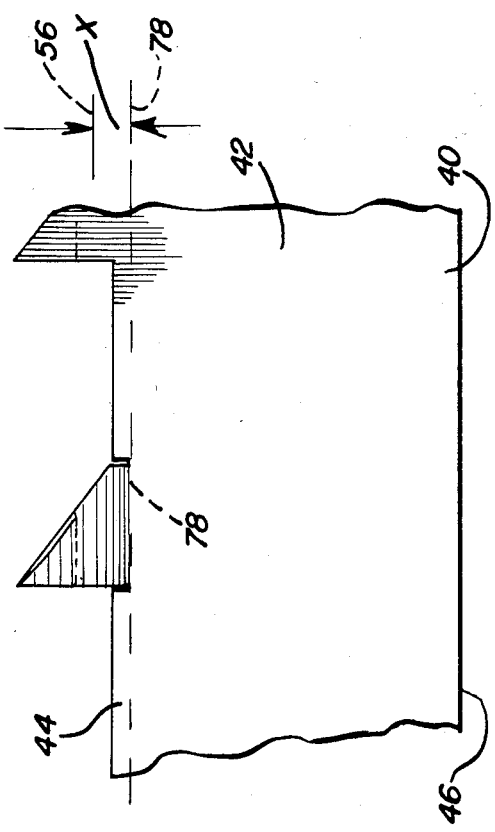
FIG. 8 is a fragmentary side elevational view of a reconditioned band saw blade.
Figure 3:
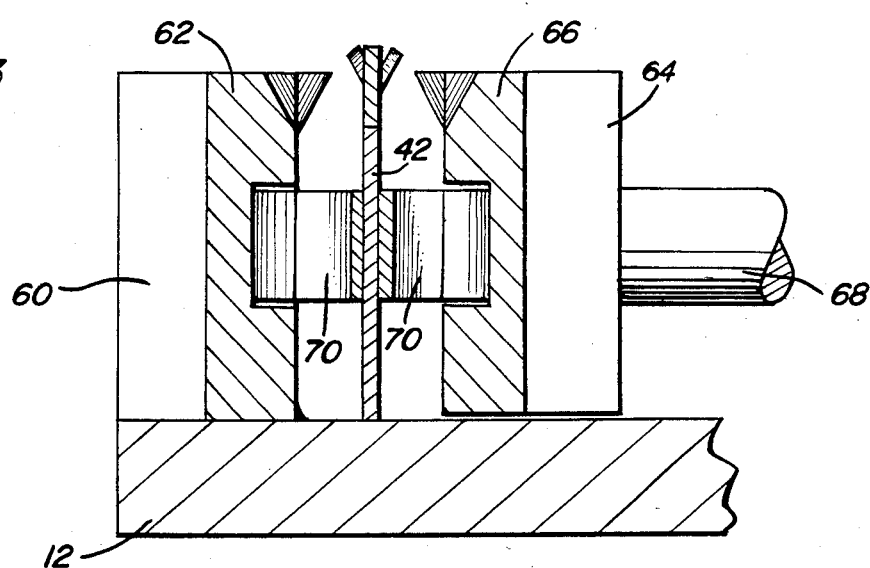
FIG. 3 is an enlarged fragmentary vertical sectional view illustrating the reset dies for resetting the right and left set teeth of a saw blade interposed between the dies and with the dies in spaced apart open position.
Figure 4:
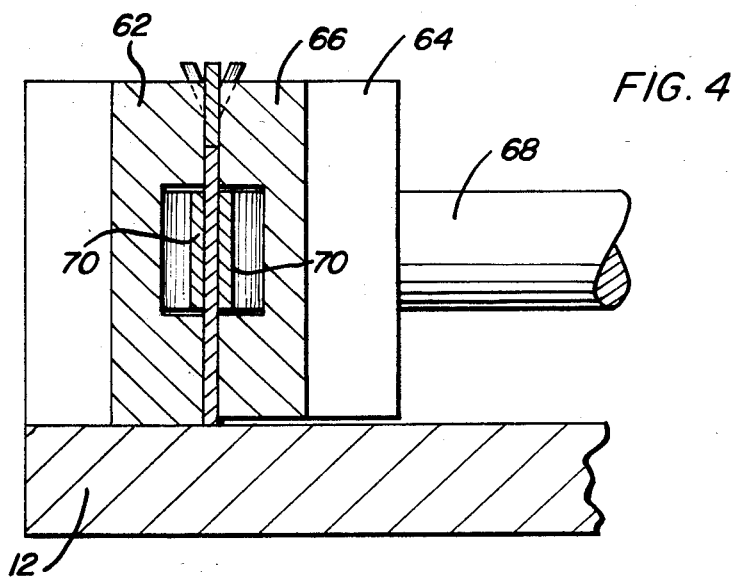
FIG. 4 is a fragmentary sectional view similar to FIG. 3 but with the dies in closed positions.

The surfaces 74 and 76 are spaced above the table 12 a distance less than the longitudinal edge 44 of the band member 42 is spaced above the table 12. In this manner, with attention now invited more specifically to FIGS. 8 and 9 of the drawings, as the teeth are reset by the dies 62 and 66, the zones along which those teeth are bent and designated by the reference numeral 78 lie slightly inwardly of the longitudinal edge 44 of the blade 40. Thus, the zone 78 is spaced inwardly of the previous bent zone 56 by a distance X, see FIG. 8.

In operation, the indexing fingers 28 properly position the adjacent sections of the blade 40 relative to the associated grinding wheel 26 and the grinding wheel is lowered and dresses a corresponding tooth of the blade 40 and previously dressed teeth are moved into registry with and between the dies 62 and 66. The die 66 is then forced toward the die 62 whereby the previous right and left set teeth 52 and 50 are reset to left and right set teeth, respectively. This places the previously worn corners 50' and 52' on the teeth 50 and 52 on the inside of the reset teeth, the teeth 48 remaining neutral set teeth. In this manner, the outer corners of the reset teeth 50 and 52 are sharp and substantially unrounded and the blade 40 is reconditioned to as near to the original saw blade as possible. Of course, after the blade 40 has once been reconditioned by the method and apparatus of this invention, further reconditioning of that blade may be be carried out.

The accumulators 30 are provided to enable the apparatus 10 to be used in conjunction with newer technology two-three pitch blades wherein the blades include alternating 2 teeth per inch and 3 teeth per inch.

Further, it will be noted that if the maximum distance between the outer extremities of the reset blades 50 and 52 measured transversely of the blade 40 is retained, inasmuch as the zone 78 is considerably lower than the zone 56 of the original blade 40, the newly and oppositely set teeth 50 and 52 are bent near the original set teeth 50 and 52. Further, the zone 78 is inwardly of the marginal edge 44 and thereby renders the newly set teeth 50 and 52 stronger.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a saw blade having an elongated cutting edge outwardly from which longitudinally spaced teeth project and wherein each tooth may include a hardened outer tip end and a root end integral with said blade and said blade includes teeth of opposite right and left hand sets spaced along said cutting edge, a blade reconditioning unit including a support, tooth reset die means mounted from said support in predetermined location thereon, said support including support means mounting said blade therefrom for intermittent guided shifting relative thereto to bring successive teeth spaced along said cutting edge into predetermined indexed position relative to said location, said teeth of opposite set being bent intermediate of said tip ends and said base ends in order to form the set thereof, said die means including means operative to engage and bend said teeth of opposite set back and past neutral set positions and to the reverse set positions with the bend areas of the reverse set teeth being formed in the longitudinal marginal portion of said blade defining said cutting edge inwardly of the base ends of said teeth.

2. The reconditioning unit of claim 1 wherein said die means includes means operative to simultaneously engage and reverse set a plurality of opposite set teeth.

3. The reconditioning unit of claim 1 wherein said saw blade comprises a band saw blade.

4. The reconditioning unit of claim 3 wherein said die means includes means operative to simultaneously engage and reverse set a plurality of opposite set teeth.

5. The reconditioning unit of claim 1 wherein said support includes a plurality of tooth reset die means mounted in predetermined locations therefrom and said support means includes tooth index means operative to position an equal number of saw blade length portions in predetermined indexed position relative to said locations.

6. The reconditioning unit of claim 1 wherein said tooth reset die means includes a stationary die holder from one side of which a first die is removably supported and a second die holder spaced outward from the side of said first die remote from the first mentioned die holder and movable toward and away from the first die, the side of the second die holder opposing the first mentioned die holder removably supporting a second die therefrom with said first and second dies including coacting oppositely angled surfaces between which tooth portions of said saw blade are receivable for bending and thus resetting said tooth portions.

7. The reconditioning unit of claim 6 wherein the opposing sides of said first and second dies include elongated opposing and bowed leaf springs mounted therefrom between which to clampingly engage said blade from opposite sides thereof as said second die moves toward said first die.

8. The reconditioning unit of claim 1 wherein said die means include means for simultaneously resetting a plurality of said teeth.

9. The method of reconditioning a saw blade having right and left set teeth projecting outwardly from one marginal edge portion of the blade and wherein the outer corners of said teeth are worn and the bend zones of said teeth defining the right and left set teeth parallel said edge and are spaced slightly outward therefrom, said method comprising engaging said right and left set teeth between opposing coacting die portions and bending said right and left set teeth back to and past neutral set positions to reversed left and right set positions with the bend zones of the reset teeth being formed slightly inwardly of said one marginal edge portion of said blade

* * * * *